(12) United States Patent
Zhou et al.

(10) Patent No.: US 8,368,766 B2
(45) Date of Patent: Feb. 5, 2013

(54) VIDEO STABILIZING METHOD AND SYSTEM USING DUAL-CAMERA SYSTEM

(75) Inventors: Jie Zhou, Beijing (CN); Dingrui Wan, Beijing (CN); Han Hu, Beijing (CN)

(73) Assignee: Tsinghua University, Beijing (CN)

( * ) Notice: Subject to any disclaimer, the term of this patent is extended or adjusted under 35 U.S.C. 154(b) by 298 days.

(21) Appl. No.: 12/836,881

(22) Filed: Jul. 15, 2010

(65) Prior Publication Data

US 2011/0013028 A1 Jan. 20, 2011

(30) Foreign Application Priority Data

Jul. 17, 2009 (CN) .......................... 2009 1 0088991

(51) Int. Cl.
*H04N 5/228* (2006.01)
*G06K 9/00* (2006.01)
*G06K 9/40* (2006.01)
*G06K 9/42* (2006.01)

(52) U.S. Cl. ................ 348/208.6; 348/208.14; 382/103; 382/106; 382/255; 382/263; 382/264

(58) Field of Classification Search .................... None
See application file for complete search history.

(56) References Cited

U.S. PATENT DOCUMENTS

| | | | |
|---|---|---|---|
| 2005/0047672 A1* | 3/2005 | Ben-Ezra et al. ............. | 382/255 |
| 2009/0041297 A1* | 2/2009 | Zhang et al. .................. | 382/103 |
| 2010/0124274 A1* | 5/2010 | Cheok et al. ............. | 375/240.03 |
| 2012/0092503 A1* | 4/2012 | Cheng ........................... | 348/159 |

OTHER PUBLICATIONS

Yasuyuki Matsushita et al., "Full-Frame Video Stabilization with Motion Inpainting," *IEEE Transaction on Pattern Analysis and Machine Intelligence*, vol. 28, No. 7, Jul. 2006, pp. 1150-1163.
Dorin Comaniciu et al., "Real-Time Tracking of Non-Rigid Objects using Mean Shift," *2000 IEEE*.
Yonatan Wexler et al., "Space-Time Completion of Video," *IEEE Transactions on Pattern Analysis and Machine Intelligence*, vol. 29, No. 3, Mar. 2007, pp. 463-476.
Herbert Bay et al., "SURF: Speeded Up Robust Features," pp. 1-14.
Barbara Zitova et al., "Image registration methods: a survey," Image and Vision Computing 21 (2003) 977-1000.

* cited by examiner

*Primary Examiner* — Lin Ye
*Assistant Examiner* — John H Morehead, III
(74) *Attorney, Agent, or Firm* — Morgan, Lewis & Bockius LLP

(57) ABSTRACT

The present invention discloses a video stabilizing method. The method may comprising the steps of: capturing a low-spatial-resolution image $I_L^t$ by a first camera and a high-spatial-resolution image $I_H^t$ by a second camera which is synchronous with the first camera for capturing an image of a moving target; determining a target region $I_{L\_tar}^t$ including the moving target in the low-spatial-resolution image $I_L^t$, and obtaining an output image $I_{out}^t$ of the high-spatial-resolution image $I_H^t$ corresponding to the target region $I_{L\_tar}^t$; generating a registration model $M_{LH}^t$ between the low-spatial-resolution image $I_L^t$ and the high-spatial-resolution image $I_H^t$; and inpainting the output image $I_{out}^t$ based on the registration model $M_{LH}^t$ and the high-spatial-resolution image $I_H^t$ to complete the output image $I_{out}^t$. The present invention further discloses a video stabilizing system using a dual-camera system.

9 Claims, 2 Drawing Sheets

(a)

(b)

VIDEO STABILIZING METHOD AND SYSTEM USING DUAL-CAMERA SYSTEM

CROSS-REFERENCE TO RELATED APPLICATIONS

This application claims priority to, and benefits of Chinese Patent Application No. 200910088991.2, filed with the State Intellectual Property Office, P.R.C. on Jul. 17, 2009, the entire contents of which are incorporated herein by reference.

BACKGROUND OF THE INVENTION

1. Field

The present invention relates to computer vision, more particularly to a video stabilizing method and a video stabilizing system for stabilizing videos with high-spatial-resolution using a dual-camera system, such as a static-active camera system or an active-active camera system.

2. Description of the Related Art

With the development of computer vision and the enhancement of worldwide attention on security, intelligent visual surveillance is now being paid more attention than ever before. And the related technology has been gradually applied for military and civilian purposes. In earlier applications, the intelligent degree is low. Therefore, security surveillance is mainly determined manually for the event occurred in the monitored videos with low degrees of reliability and automation. And it is mainly used for criminal evidence collection in visual surveillance. However, presently, intelligent visual surveillance pays more attention to criminal early warning to reduce occurrence of criminal cases.

In traditional surveillance, a single static camera has been unsuitable for modern surveillance requirement. Firstly, because the single static camera has a fixed viewpoint and when the moving target moves out of the viewing field, information of the monitored target will be completely lost. Secondly, due to the conflict between image resolution and the size of the viewing field, the viewing field will be relatively small if the required image resolution is high, especially for long-distance surveillance.

Therefore, a single active camera may be adopted to solve the conflict between the image resolution and the size or dimension of the viewing field. However, during the active tracking of the moving target, due to the continuous changes of the camera parameters, the background and the target in the image will move accordingly, so that it is very difficult to accurately predict the movement of the target. On the other hand, the camera can not be accurately controlled in addition to the difficult estimation of the camera movement time, so that the target may easily lost in the image or video whether an computer-controlled automatic tracking method or a manual tracking method is adopted. Therefore, robustness for capturing high-spatial-resolution video of a target by a single active camera is low.

Thus, video stabilization shall be performed to make the moving target in the video run more smoothly with improved visualization effect. In addition, after video stabilization, desired features may be easily extracted from the monitored target. Further, computer vision researches may be performed on the videos after video stabilizing, such as gesture recognition, behavior and gait analysis, or object identification.

In the case of long-distance surveillance, high-spatial-resolution frames of the interested targets captured may need to perform stabilization to increase video visualization effects. Generally, because there is a long distance between the target and the high-spatial-resolution camera, minor trembling of the camera may lead to severe changes of the moving targets in the image, thus the video visualization effect is inferior.

Further, for long-distance high-spatial-resolution surveillance, it is challenging to obtain a stabilized video with high-spatial-resolution, because there are problems such as image blurriness, and incompleteness in the acquired high-spatial-resolution video. The image blurriness is mainly caused by camera shaking, because the camera has to be operated in a high-speed mode to ensure the effective tracking of the active camera to the moving target, which may cause image blurriness in the video. In a prior dual-camera monitoring system, although a low-spatial-resolution camera is used for preventing the moving target from being lost, it is difficult to ensure each high-spatial-resolution frame to completely contain the moving target. Because each action of the active camera does need a certain time period for response which is hard to be accurately determined, thus there is always overtuning such as overshooting or undershooting due to the time delay in mechanical movement during controlling of the camera. Further, there may be a dithering region in the obtained video thereof. If the moving target runs at overspeed, there is an over-controlling frequency of the active camera which may result in inter-frame dithering.

SUMMARY

In viewing thereof, the present invention is directed to solve at least one of the problems existing in the prior art. Accordingly, a video stabilizing method using a dual-camera system may be provided, in which long-distance surveillance may be performed via a high-spatial-resolution video which is stabilized. Further, a video stabilizing system using a dual-camera system may be provided, which may improve video surveillance via the high-spatial-resolution video which is stabilized.

According to an aspect of the present invention, a video stabilizing method using a dual-camera system may be provided, comprising the following steps of: 1) capturing a low-spatial-resolution image $I_L^t$ by a first camera for monitoring a panoramic area and a high-spatial-resolution image $I_H^t$ by a second camera which is synchronous with the first camera for capturing an image of a moving target where $I_L^t$, $I_H^t$ represent the low-spatial-resolution image and the high-spatial-resolution image at the $t^{th}$ frame respectively; 2) determining a target region $I_{L\_tar}^t$ including the moving target in the low-spatial-resolution image $I_L^t$, and obtaining an output image $I_{out}^t$ of the high-spatial-resolution image $I_H^t$ corresponding to the target region $I_{L\_tar}^t$; 3) generating a registration model $M_{LH}^t$ between the low-spatial-resolution image $I_L^t$ and the high-spatial-resolution image $I_H^t$, and 4) inpainting the output image $I_{out}^t$ based on the registration model $M_{LH}^t$ and the high-spatial-resolution image $I_H^t$ to complete the output image $I_{out}^t$.

According to another aspect of the present invention, a video stabilizing system using a dual-camera system may be provided, comprising a first camera unit, a second camera unit and a controller. The first camera unit may monitor a panoramic image and obtaining a low-spatial-resolution image $I_L^t$ where $I_L^t$ may represent the low-spatial-resolution image at the $t^{th}$ frame. The second camera unit may capture a moving target and sample a high-spatial-resolution image $I_H^t$, where $I_H^t$ may represent the high-spatial-resolution image at the $t^{th}$ frame, the second camera unit being synchronous with the first camera unit. And the controller may receive the low-spatial-resolution image $I_L^t$ and the high-spatial-resolution image $I_H^t$, output an output image $I_{out}^t$ of the high-spatialresolution image $I_H^t$ corresponding to a target region $I_{L\_tar}^t$ where the moving target may be located in the low-spatial-resolution image $I_L^t$, generate a registration model $M_{LH}^t$ between the low-spatial-resolution image $I_L^t$ and the high-spatial-resolution image $I_H^t$, and inpaint the output image $I_{out}^t$ based on the registration model $M_{LH}^t$ and the high-spatial-resolution image $I_H^t$ to complete the output image $I_{out}^t$.

According to the present invention, image registration problems between videos with different spatial resolutions may be solved smoothly. In addition, four following types of image completion strategies may be proposed: high-spatial-resolution image inpainting; high-spatial-resolution background image inpainting; foreground image inpainting and low-spatial-resolution image inpainting. Thus, current high-spatial-resolution information and historic high-spatial-resolution information may be fully used to inpaint the target video. Through the above processing, the video may be used for collection of criminal evidences, storage of surveillance records, behavioral analysis of moving targets, etc. Experimental results have shown that the proposed stabilization and completion algorithms work well.

Additional aspects and advantages of the embodiments of present invention will be given in part in the following descriptions, become apparent in part from the following descriptions, or be learned from the practice of the embodiments present invention.

BRIEF DESCRIPTION OF THE DRAWINGS

These and other aspects and advantages of the invention will become apparent and more readily appreciated from the following descriptions taken in conjunction with the drawings in which:

FIG. 2 is an intensity adjusting schematic view of a video stabilizing method according to an embodiment of the present invention, in which FIG. 2(a) is a fitting diagram of a piecewise linear model according to an embodiment of the present invention, FIG. 2(b) is a histogram of an original low-spatial-resolution image according to an embodiment of the present invention, FIG. 2(c) is a histogram of a high-spatial-resolution image according to an embodiment of the present invention, and FIG. 2(d) is a histogram of an adjusted low-spatial-resolution image according to an embodiment of the present invention; and FIG. 3 is a block diagram for computing an optical flow field according to an embodiment of the invention, in which FIG. 3(a) is a block diagram for computing an inter-frame high-spatial-resolution optical flow field according to an embodiment of the present invention, FIG. 3(b) is a block diagram for computing an inter-frame low-spatial-resolution optical flow field according to an embodiment of the present invention.

Figure Numeral Designation:

Figure 1:
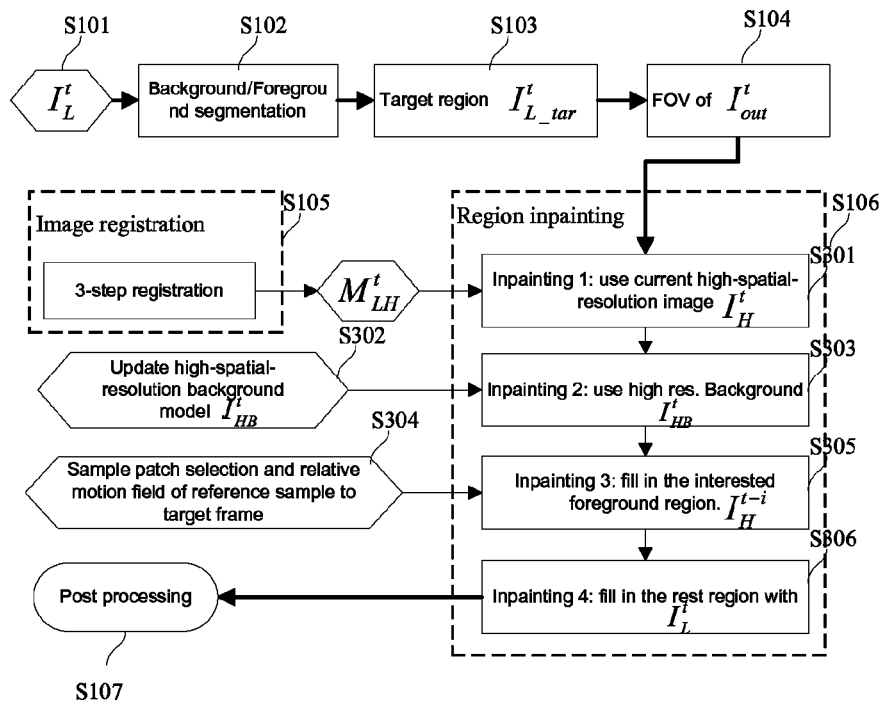
FIG. 1 is a flow chart of a video stabilizing method according to an embodiment of the present invention.

$I_L^t$: a low-spatial-resolution image at the $t^{th}$ frame;

$I_H^t$: a high-spatial-resolution image at the $t^{th}$ frame;

$I_{LB}^t$: a low-spatial-resolution background image at the $t^{th}$ frame;

$I_{HB}^t$: an updated high-spatial-resolution background image corresponding to $I_{LB}^t$ at the $t^{th}$ frame;

$I_{L\_tar}^t$: a target region in the low-spatial-resolution image at the $t^{th}$ frame;

$I_{L\_adj}^t$: an image after adjusting intensity of $I_L^t$;

$I_{H\_adj}^t$: an image of $I_H^t$ transformed by $M_{LH1}^t$;

$I_{out}^t$: an output image at the $t^{th}$ frame;

$k_o$: a magnifying factor of the output image relative to the low-spatial-resolution target region;

$M_{LH1}^t$: a rough registration model between $I_L^t$ and $I_H^t$ at the $t^{th}$ frame;

$M_{LH2}^t$: a refined registration model between $I_L^t$ and $I_H^t$ at the $t^{th}$ frame;

$M_{LH}^t$: a final registration model between $I_L^t$ and $I_H^t$ at the $t^{th}$ frame;

$M_j^t$: a transforming model from the $j^{th}$ high-spatial-resolution image to the $i^{th}$ high-spatial-resolution image;

$SP_L^i$: a low-spatial-resolution fixed reference frame (40×40) containing only the foreground target in the $i^{th}$ frame;

$SP_H^i$: a high-spatial-resolution reference frame (200×200) corresponding to $SP_L^i$ containing only the foreground target in the $i^{th}$ frame;

$R_1$: an image region of the output image inpainted in step 4.2.1);

$R_2$: an image region of the output image inpainted in step 4.2.2);

$R_3$: an image region of the output image inpainted in step 4.2.3); and $R_4$: an image region of the output image inpainted in step 4.2.4).

DETAILED DESCRIPTION OF EMBODIMENTS OF THE INVENTION

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

According to the present invention, a novel framework to stabilize and complete such video using a dual camera system is proposed, of which one camera serves as a panorama with low spatial resolution, and the other is an active camera such as a PTZ (pan-tilt-zoom) camera capturing high-spatial-resolution images. As the discrepancy in resolution between two synchronized videos will increase the registration difficulty, we propose a three-step stabilization approach to deal with this problem at each frame. In order to make full use of the high-spatial-resolution information, four types of image completion strategies are designed: current high-spatial-resolution image inpainting; high-spatial-resolution background model inpainting; sample patch with motion field based foreground inpainting and current scaled low-spatial-resolution image inpainting.

To be specific, the general inventive concept of the present invention is as follows.

The first aspect relates to registration between images with different spatial resolutions. And the present invention combines feature-based approach and pixel-based approach, and a three-step registration method is designed which can effectively achieves registration of images with different spatial resolutions.

The second aspect relates to strategies for inpainting high-spatial-resolution information. Firstly, a region with high-spatial-resolution information of the current frame is directly inpainted. For the un-inpainted regions, historic high-spatial-resolution information is used for further inpainting. And the inpainting concept is as follows: foreground and background image segmentations are performed for each pixel in the viewing field to be inpainted. The background layer may be inpainted by generating a high-spatial-resolution background model. And the foreground layer may be inpainted by a method based on reference sample patch and relative motion field.

The third aspect relates to video or image postprocessing. If neighboring pixels use inpainting information with different spatial resolutions, unsmoothness in a single frame image may occur. Therefore, image postprocessing may be necessary to improve visualization effects.

Further, according to an embodiment of the present invention, a static-active or active-active camera system is used to provide a video stabilizing method or system for video stabilization, in which a camera may be used as a low-spatial-resolution camera for real time tracking to the moving target, with another camera being used as a high-spatial-resolution camera for active tracking of the moving target to obtain information of the moving target. For the active-active camera system, on one hand, an active camera may be used as a static camera for flexible purpose. On the other hand, in consideration of system symmetry, if both active cameras are consistent, it would be very convenient for switching the active cameras based on different missions.

In all, the video stabilization and completion has the following goals: 1) to keep the interesting target near the center of the output image; 2) to keep intact the spatial image content of the output image; and 3) the output image contains as much high-spatial-resolution information as possible, which will be achieved by the solution as described hereinbelow.

In the following, the video stabilizing method according to an embodiment of the present invention will be described in detail with reference to the accompanying figures, in which FIG. 1 is a flow chart of the video stabilizing method according to an embodiment of the present invention. The video stabilizing method may include the steps as follows.

Step S101: A low-spatial-resolution image $I_L^t$ is captured by a first camera for monitoring a panoramic area and a high-spatial-resolution image $I_H^t$ is captured by a second camera which is synchronous with the first camera for capturing an image of a moving target, where $I_L^t$, $I_H^t$ may represent the low-spatial-resolution image and the high-spatial-resolution image at the $t^{th}$ frame respectively. In this step, the first and second cameras may use a PTZ (pan-tilt-zoom) camera respectively.

Step S102: Foreground image and background image may be segmented in the low-spatial-resolution image $I_L^t$.

Step S103: A target region $I_{L\_tar}^t$ is determined based on the low-spatial-resolution image $I_L^t$ and the foreground image of the obtained low-spatial-resolution image $I_L^t$. Firstly, a Mean-shift tracking algorithm is used for obtaining the track of the interested target. According to an embodiment of the present invention, considering the smoothing requirement, centers of the target in the neighboring frames, such as 50 frames, are averaged for smoothing purpose. According to an embodiment of the present invention, a rectangular region $I_{L\_tar}^t$ may represent the target region with a dimension of 64 pixels×48 pixels. The center of the region is the target center after smoothing. However, it should be noted that the dimension of the target region $I_{L\_tar}^t$ may be adjusted as required, which also falls within the scope of the present invention. During target tracking, a background model is obtained by a running average method with an updating coefficient of 0.05, and a Gaussian background may be generated for the low-spatial-resolution video to obtain the foreground region and the background region $I_{LB}^t$ in the low-spatial-resolution image $I_L^t$.

Step S104: The viewing field of the output image $I_{out}^t$ is determined. Because the present invention is designed for long-distance surveillance, the dimension of the output image $I_{out}^t$ may be set to be $k_o$ times as large as that of $I_{L\_tar}^t$. According to an embodiment of the present invention, $k_o=5$.

Step S105: Registration may be performed between video images with different spatial resolutions. That is to say, a mapping model is obtained between the high-spatial-resolution image $I_H^t$ and the low-spatial-resolution image $I_L^t$.

Presently, there are still no accurate definitions for video stabilization. And the evaluation strategies for video stabilization at present mainly lie in that the interested target is located near the image center and the movement of the moving interested target is as continuous and smooth as possible. For achieving both purposes as described hereinbefore, the region in the high-spatial-resolution image $I_H^t$ corresponding to the target region in the low-spatial-resolution image $I_L^t$ is outputted as an output image $I_{out}^t$. Then, a mapping model between the high-spatial-resolution image $I_H^t$ and the output image $I_{out}^t$ is calculated. During the calculation of the registration model between the high-spatial-resolution image $I_H^t$ and the output image $I_{out}^t$, there is only a scale transforming relationship between the output image $I_{out}^t$ and the target region $I_{L\_tar}^t$, thus only the transforming model between the high-spatial-resolution image $I_H^t$ and low-spatial-resolution image $I_L^t$ is needed. Further, because there is a short distance between the first and second cameras, the distance difference of the first and second cameras relative to the monitored scene may be omitted. Therefore, according to an embodiment of the present invention, a registration model or an affine model may be used as the transforming model between the high-spatial-resolution image $I_H^t$ and low-spatial-resolution image $I_L^t$.

Firstly, a rough registration or affine model may be estimated by using a feature-point matching method, and then the intensity of the low-spatial-resolution image $I_L^t$ may be adjusted by the rough affine model, and finally a refined or accurate affine model may be estimated by a pixel-based direct method. There is a requirement of accuracy between the low-spatial-resolution image and the high-spatial-resolution image. And the accuracy of the model can ensure the low-spatial-resolution panoramic image to be used as a bridge for the high-spatial-resolution images at different time. And when the high-spatial-resolution information is invalid, the panoramic image after interpolation may be used for inpainting. The accuracy of the model is ensured by the following two-step registration. When a fixed point in a scene is selected, the point which is transformed from the panoramic image to the high-spatial-resolution image via the affine model has a minimal difference with the actual coordinates of the point at each time. And the smoothness of the model is reflected by the minimal difference between the point coordinates in the high-spatial-resolution image affined at different time. According to an embodiment of the present invention, to reduce the computing load of the registration model, the image of each frame is transformed into a gray image.

According to an embodiment of the present invention, the step of generating the mapping model or registration model between the high-spatial-resolution image $I_H^t$ and the low-spatial-resolution image $I_L^t$ may include the following steps.

Step S201: The rough affine model $M_{LH1}^t$ is estimated by a feature-point matching method. Because the magnification factor between the high-spatial-resolution image $I_H^t$ and the low-spatial-resolution image $I_L^t$ is unknown, feature point operator with scale invariability is selected. According to an embodiment of the present invention, feature point operator SURF (Speeded Up Robust Feature) is adopted, which is one of the most widely used descriptors presently. To reduce the computing load, only the feature points in the target region $I_{L\_tar}^t$ of the low-spatial-resolution image $I_L^t$ are calculated.

During feature matching, matched feature point pairs are obtained via an approximate nearest neighbors (ANN) method. If the matched pair number is less than 10, $M_{LH1}{}^t$ will be invalid, and $M_{LH}{}^t$ will not be calculated. Otherwise, the rough affine model $M_{LH1}{}^t$ using the feature points will be estimated as follows.

The SURF matched feature point pairs between the target region $I_{L\_tar}{}^t$ in high-spatial-resolution image $I_H{}^t$ and the low-spatial-resolution $I_L{}^t$ may be designated by $\{(x_i{}^1, y_i{}^1) \in I_L{}^t, (x_i{}^2, y_i{}^2) \in I_H{}^t\}$, i=1, 2, . . . , n, and the affine transforming matrix is:

$$M_{LH1}^t = \begin{bmatrix} m_1 & m_2 & m_3 \\ m_4 & m_5 & m_6 \\ 0 & 0 & 1 \end{bmatrix}, \text{ and}$$

$$[m_1, m_2, m_3, m_4, m_5, m_6]^T = (A^T A)^{-1} AX,$$

$$A = \begin{bmatrix} x_1^1 & y_1^1 & 1 & 0 & 0 & 0 \\ 0 & 0 & 0 & x_1^1 & y_1^1 & 1 \\ x_2^1 & y_2^1 & 1 & 0 & 0 & 0 \\ 0 & 0 & 0 & x_2^1 & y_2^1 & 1 \\ \vdots & \vdots & \vdots & \vdots & \vdots & \vdots \\ x_n^1 & x_n^1 & 1 & 0 & 0 & 0 \\ 0 & 0 & 0 & x_1^1 & x_1^1 & 1 \end{bmatrix}, X = \begin{bmatrix} x_1^2 \\ y_1^2 \\ x_2^2 \\ y_2^2 \\ \vdots \\ x_n^2 \\ y_n^2 \end{bmatrix},$$

in which,

Step S202: Intensity thereof is adjusted to obtain a mapping model MI(k) between the intensities of the two images. According to an embodiment of the present invention, a polygon with a minimum size including all the feature points is estimated for the matched feature point pairs set in the two images, and the pixel intensities inside the polygon are sampled to determine an intensity mapping relationship using a method similar to the histogram equalization method. For the mapping model, there may be many options. According to an embodiment of the present invention, a piece-wise linear model is adopted. Firstly, the intensity histograms are accumulated to obtain an accumulated histogram:

$$Accu(k) = \sum_{i=1}^{k} hist(i), k = 1, 2, \ldots, 32$$

in which Accu(k) is a monotonic increasing function of variable k. And a three-piece-wise linear model is selected as the mapping model. And the intensity sets are as follows:

$K_1 = \{k: 0 \leq Accu(k) < 0.05\}$ $K_2 = \{k: 0.05 \leq Accu(k) < 0.95\}$ $K_3 = \{k: 0.95 \leq Accu(k) \leq 1\}$ And the intensity mapping function MI(k) between $I_L{}^t$ and $I_H{}^t$ is linearly fitted by the following objective function:

$$\min_{MI} \sum_{k \in K_2} |Accu^1(k) - Accu^2(MI(k))|$$

in which $Accu^1$ and $Accu^2$ represent the accumulated distribution histograms on the two images, $I_L{}^t$ and $I_H{}^t$, respectively. To ensure intensity continuity and effectiveness, the remaining two parts of intensity sets K1 and K2 fit a linear model respectively so that MI(0)=0 and MI(255)=255.

Figure 2:
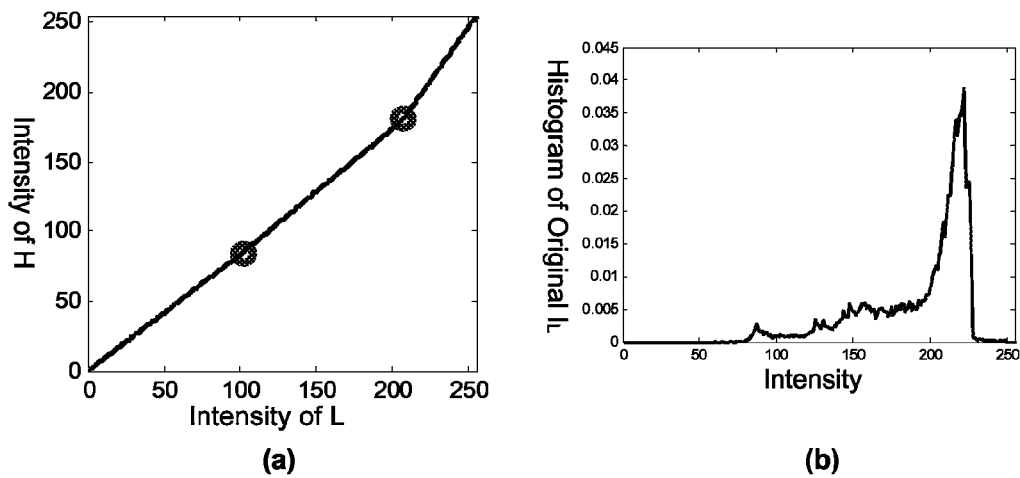
Figure 2:
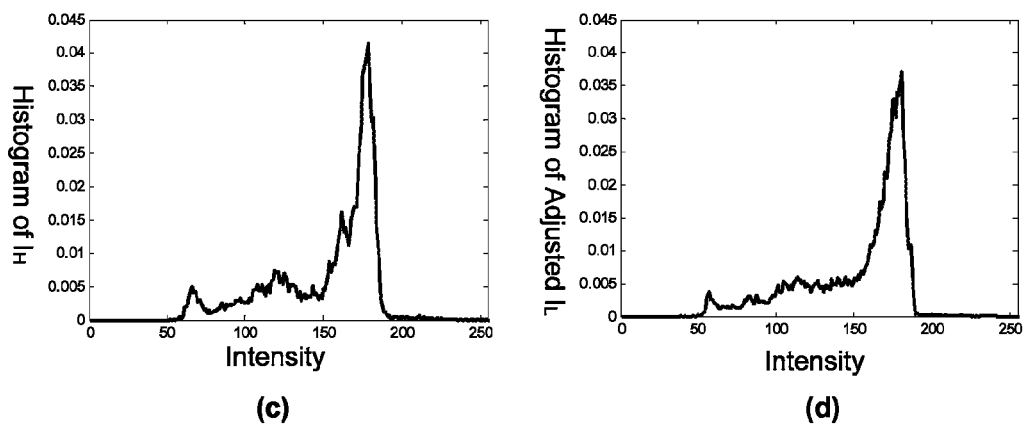

And $I_L{}^t$ may be adjusted by the mapping model MI(k) to obtain $I_{L\_adj}{}^t$. As shown in FIG. 2, FIG. 2(a) is a fitting diagram of a piece-wise linear model according to an embodiment of the present invention, FIG. 2(b) is a histogram of an original image with low-spatial-resolution according to an embodiment of the present invention, FIG. 2(c) is a histogram of an image with high-spatial-resolution according to an embodiment of the present invention, and FIG. 2(d) is a histogram of an adjusted image with low-spatial-resolution according to an embodiment of the present invention. From the figures, the adjusted histogram is more similar to the histogram of the high-spatial-resolution image, so that the refined registration via the direct pixel-based method in the following may be performed.

Step S203: Refined affine model is estimated directly via the pixel-based method. The rough affine model $M_{LH1}{}^t$ between the two images, and $I_L{}^t$ and $I_H{}^t$, and the mapping model MI(k) therebetween is obtained via the feature-based rough registration. Firstly, $I_H{}^t$ is transformed by $M_{LH1}{}^t$ in the present invention to obtain $I_{H\_adj}{}^t$. Then $M_0 = I_{3 \times 3}$ is used as an initial value for iteratively estimating a more accurate mapping model. And the optimal objective is the minimum value of the following formula:

$$M_I = \arg\min_M \sum_i \|I_{H\_adj}^t(x_i, y_i) - I_{L\_adj}^t(f(x_i, y_i, M))\|$$

in which $f(x_i, M)$ is a homogeneous coordinates conversion function, and the optimization problem is iteratively solved by the gradient based Hessian matrix. And $f(x_i, M)$ is calculated as follows:

$$(x', y', 1)^T = M(x, y, 1), f(x, y, M) = (x', y')$$

If $M_I$ satisfies either of the following two conditions, $M_I$ will be considered to be invalid, and the calculation of $M_{LH}{}^t$ will be skipped.

a) $\|R_{2 \times 2}{}^M - I_{2 \times 2}\|_\infty < 0.3$;

b) $\|t_{2 \times 1}{}^M\|_\infty < 4$, in which $M_I = [R^M t^M]$, $[R_{2 \times 2}{}^M t_{2 \times 1}{}^M]$ is the first two rows of $M_I$. If both $M_I$ and $M_{LH1}{}^t$ are valid, $M_{LH2}{}^t = M_{LH1}{}^t M_{refined}{}^t$, otherwise the following steps will be skipped and $M_{LH}{}^t$ will not be calculated.

Step S203: Model Smoothing.

Firstly, a mapping model $M_j{}^i$ between two high-spatial-resolution images is obtained. Because there are many problems for directly solving the mapping model between the two high-spatial-resolution images, the high-spatial-resolution image region will be firstly filtered by the background region in the obtained panoramic image sequence, with the background portion remained, so that the registration error caused by the foreground movement will be eliminated. Then, the SURF feature points extracted during the rough matching is used to match the feature points in the background region, and the transforming model is estimated. Similarly, if the number of the feature point pairs is less than 10, the mapping model $M_j{}^i$ will be invalid.

And a smoothing model $M_{LH}^{t}$ is solved via the following formula:

$$M_{LH}^{t} = \frac{\sum_{i=t-N}^{t+N} \omega_i \delta_i M_i^t M_{LH2}^i}{\sum_{i=t-N}^{t+N} \omega_i \delta_i}$$

in which $\omega_i$ is the Gaussian weight, N=5, $$\omega_i = \frac{1}{\sqrt{2\pi}\,\sigma} e^{\frac{(i-t)^2}{2\sigma^2}} \quad (\sigma = 1.5),$$

$\delta_i$ is the characteristic function satisfying:

$$\delta_j = \begin{cases} 1, & \text{if } M_j^i \text{ and } M_{LH2}^i \text{ are both valid} \\ 0, & \text{otherwise} \end{cases}$$

Finally, the relative blurriness $b_t$ of the current frame may be calculated as follows:

$$b_t = \frac{1}{\sum_{p_t}[dx^2(p_t) + dy^2(p_t)]}$$

in which dx(•) and dy(•) are the gradients in x-direction and y-direction in the image respectively. If $b_t > 1.3 \min\{b_{t-1}, b_{t+1}\}$, it will be considered that the current frame is a blurred image, and $M_{LH}^t$ will be set to be invalid.

Step S106: Image Completion

Because the high-spatial-resolution image may not overlap the whole outputted image regions, to complete the outputted image, the invisible regions in the high-spatial-resolution image may need to be inpainted. According to an embodiment of the present invention, four strategies are adopted in turn to inpaint the output image so that historic high-spatial-resolution information may be utilized maximally. Finally, the image is post processed to ensure continuity of image intensity and spatial continuity. The specific steps thereof are as follows.

Step S301: Strategy 1 is used for inpainting, i.e., inpainting by the high-spatial-resolution image. If $M_{LH}^t$ is valid, $I_H^t$ may be transformed to $I_{out}^t$ via $M_{LH}^t$, and the overlapped region can be inpainted by $I_H^t$.

Step S302: The high-spatial-resolution background image is estimated to update the high-spatial-resolution background model $I_{HB}^t$. Hereinbefore, the foreground image and background image segmenting have been segmented for the low-spatial-resolution image $I_L^t$. If $M_{LH}^t$ of the current image is valid, the background region in the current high-spatial-resolution image $I_H^t$ may be obtained via the background region $I_{LB}^t$ in $I_L^t$. The background model $I_{HB}^t$ is updated by the high-spatial-resolution regions in the 1th 2th, . . . , (t+50)$^{th}$ frames. For the background model $I_{HB}^{t+1}$ of the next frame, if $M_{LH}^t$ is valid, the background region of the $I_H^{t+51}$ will be mapped onto $I_{HB}^t$, and the overlapped region will be updated with an attenuation factor 0.5, that is to say, the pixel intensity of the background region may be processed as follows: $I_{HB}^{t+1} = 0.5 I_{HB}^t + 0.5 I_H^{t+51}$, otherwise, $I_{HB}^{t+1} = I_{HB}^t$.

Step S303: Strategy 2 is used for inpainting, i.e., inpainting by the high-spatial-resolution background image. If the unfilled region of the output image contains background pixels, $I_{HB}^t$ may be used for inpainting.

Step S304: Reference sample patch (SP) may be selected, and relative motion between the reference sample patch and the target frame may be calculated. And the key points of the step S304 lie in that:

1) The constructing and updating of the reference sample set;

2) How to select the optimal reference sample for the frame to be inpainted; and 3) How to calculate the relative motion field under high-spatial-resolution while taking the temporal and spatial continuities into consideration.

The frame to be inpainted means that, exemplified by the $t^{th}$ frame, if it satisfies one of the following conditions, the foreground image may need to be inpainted by this frame using this strategy:

a) $M_{LH}^t$ is invalid;

b) $I_H^t$ does not contain all of the interested targets; and c) $I_H^t$ is a blurred image, which may be determined by the relative blurriness $b_t$ as described hereinabove.

Step S401: Generating and Updating Reference Frame Sequence

The reference sample patch may comprise a pair of image blocks containing foreground regions respectively, i.e. and $I_L^t$ and $I_H^t$ with only the foreground regions remained, which may be designated by $SP^t = \{SP_L^t, SP_H^t\}$, and the reference frame sequence is updated by FIFO (FIRST-IN-FIRST-OUT) strategy. According to an embodiment of the present invention, the sequence may have a maximum length of 60. When the current $t^{th}$ frame satisfies the following three conditions, the frame may generate a reference sample:

a) $M_{LH}^t$ is valid;

b) $I_H^t$ contains all of the interested targets; and c) $I_H^t$ is not a blurred image Step S402: Selecting the reference frame $SP^{ref_t}$ related to the current frame For the $t^{th}$ frame, only the region in $I_L^t$ containing the entire target is considered which is denoted as sub($I_L^t$). And similarities of all the $SP_L^i$ (i=1, 2, . . . , 60) with the sub($I_L^t$) are calculated, and the similarity may be determined by the following method.

Firstly, a translation model $(dx, dy)^T$ from $SP_L^i$ to sub($I_L^t$) is calculated. The initial value is selected as the difference between the center point coordinates of the foreground target in sub($I_L^t$) and center point coordinates of the foreground target in the $SP_L^i$. Then, Newton iterating algorithm based on Hessian matrix is used for obtaining the translation model $(dx, dy)^T$.

Then, similarity may be calculated based on the following formula:

$$\exp\left(-\frac{1}{Num(p)} \sum_{p \in Foreg(I_L^t), p-(dx,dy)^T \in Foreg(SP_L^i)} |(sub(I_L^t))(p) - SP_L^i(p-(dx,dy)^T)| \right)$$

in which Foreg($SP_L^i$) is the pixel sets of the foreground target in $SP_L^i$, Foreg($I_L^t$) is the pixel sets of the foreground target in $I_L^t$, p is a pixel in the intersection of the foreground pixel set of $SP_L^i$ after translation transformation and the Foreg($I_L^t$), Num(p) is the pixel number in the intersection. If the pixel number in the intersection is less than 60% of the pixels in the Foreg($SP_L^i$) or less than 60% of the pixels in Foreg($I_L^t$), the similarity will be zero.

If the current frame is valid, the current frame will be a related reference frame which is denoted as $SP^{ref_i}$, i.e. $ref_i$=t, otherwise, the reference frame having a minimal similarity with the sub($I_L^t$) is used as the related reference frame. If the maximal similarity is less than a similarity threshold $Th_{MAD}$=exp(−20), it will be considered that there is no related reference frame with sub($I_L^t$) i.e., the $SP^{ref_i}$ is invalid, otherwise, $SP^{ref_i}$ is valid.

Step S403: Inter-frame high-spatial-resolution image optical flow field $V^H$ between the current frame and the reference frame is estimated.

The step of estimating the $V^H$ via $SP_H^{ref_i}$(i=t−1,t,t+1) may be as follows.

First step: The $SP_H^{ref_{t-1}}$, $SP_H^{ref_t}$, $SP_H^{ref_{t+1}}$ are adjusted to $SP_{t-1}^t$, $SP_t^t$, $SP_{t+1}^t$ respectively to enhance comparability on a more uniform scale, since $ref_i$, (i=t−1,t,t+1) are sampled at different time with possible scale and translation variation. If they are pre-adjusted, the comparability therebetween may be increased to reduce the introduced errors in the following optical flow estimation. Affine transformation may be presumably adopted in the present invention with only scale transformation and translation transformation considered. Because the $t^{th}$ frame is the target to be processed, the center and dimension of the target in $I_L^t$ may be used as a reference.

Second step: The high-spatial-resolution optical flow field $V^H$ is estimated by the adjusted $SP_{t-1}^t$, $SP_t^t$, $SP_{t+1}^t$.

The optical flow field is used because there are differences on the image contents although these reference frames may have been adjusted, and the differences thereof may not be described easily and accurately via models such as affine model or projection model. And pyramidal Lucas-Kanade optical flow method is used for estimating the optical flow fields $V_{t,t-1}^H$ and $V_{t,t+1}^H$ from $SP_t^t$ to $SP_{t-1}^t$ and $SP_{t+1}^t$ respectively. Based on the assumption of inter-frame continuity, it may be considered that the inter-frame optical flow satisfies the linear model approximately. That is to say, under an ideal condition, the optical flow at (x, y) in $SP_t^t$ satisfies $V_{t,t-1}^H$(x, y)=−$V_{t,t+1}^H$(x, y). Therefore, the optical flow filed $V^H$ from $SP_t^t$ to the target frame $I_t^H$ may be approximated by $$\frac{1}{2}(V_{t,t-1}^H + V_{t,t+1}^H),$$

i.e.:

$$V^H = \frac{1}{2}(V_{t,t-1}^H + V_{t,t+1}^H)$$

Step S404: Inter-frame low-spatial-resolution image optical flow field $V^L$ is estimated.

Optical flow field from sub($I_L^{ref_i}$) adjusted by $M_{ref(t)}^{ST}$, designated by sub($I_L^{ref_i}$), to tar($I_L^t$) is considered. Although $V^H$ comprises the temporal and spatial continuity assumption, there may be a great local difference between $SP_t^t$ and the target frame $I_t^H$, the assumption of $V_{t,t-1}^H$(x, y)=−$V_{t,t+1}^H$(x, y) may not be satisfied which may lead to invalidity of $V^H$(x, y) or singularity. In addition, if $SP_{t-1}$ and $SP_{t+1}$ are invalid, $V^H$ is invalid at this time. Therefore, it is necessary to construct a corresponding relationship between $SP_t^t$ and the target frame $I_t^H$. Because $I_t^H$ is an unknown target image, it may only be obtained by the low-spatial-resolution image sub($I_L^{ref}$)$_{adj}$ corresponding thereto and tar($I_L^t$). Because it may be considered to be smooth locally between sub($I_L^{ref_i}$)$_{adj}$ and tar($I_L^t$), although the optical flow field is obtained under a low scale, it may still reflect the approximate local differences after it is magnified to the scale of $I_j^H$.

According to an embodiment of the present invention, the pyramidal Lucas-Kanade method is used for estimating the optical flow field $F_L^t$ between sub($I_L^{ref_i}$)$_{adj}$ and tar($I_L^t$). According to an embodiment of the present invention, $V^L$=5$F_L^t$.

Figure 3:
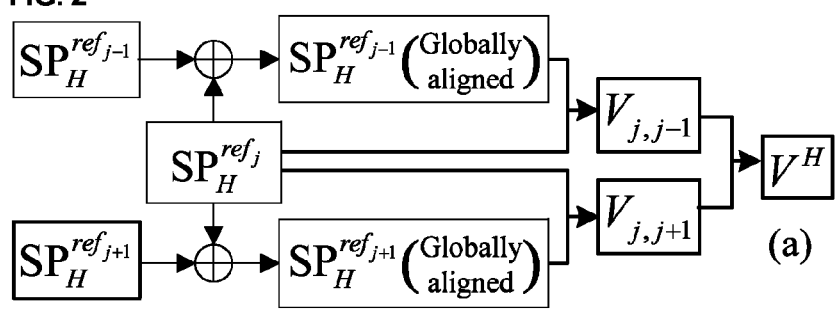
Figure 3:
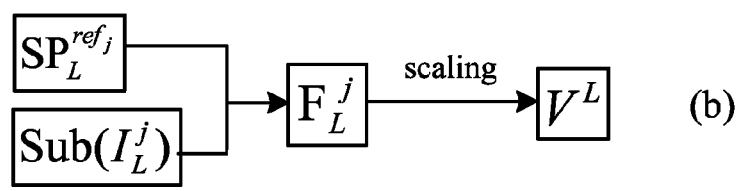

The flow chart for calculating $V^H$ and $V^L$ is shown in FIG. 3.

Step S405: Optical flow field $F_H^t$ between $SP_H^{ref_t}$ and $I_{out}^t$ is estimated.

If $SP^{ref_i}$ is valid, the optical flow field $F_H^t$ will be estimated. The calculation of the optical flow field from $SP_t^t$ to the target frame or the output frame $I_{out}^t$ is mainly through the following three steps.

a) The high-spatial-resolution optical flow field $V^H$ is obtained using the adjusted $SP_{t-1}^t$, $SP_t^t$ and $SP_{t+1}^t$, which reflects temporal continuity;

b) The low-spatial-resolution optical flow field $V^L$ is obtained using sub($I_L^{ref_i}$)$_{adj}$ and tar($I_L^t$), which reflects accuracy of the spatial position, especially in the case of $V^H$ being invalid when the neighboring frames have no corresponding SPs;

c) optical flow field smoothing is performed for the $V^H$ and $V^L$ with the singular optical flow value removed. It should be noted that if $V^H$ and $V^L$ are obtained with the smoothness considered, this step may be omitted.

$F_H^t$ may be solved by the following formula:

$$minE = \beta \sum_{(x,y) \in V} \omega_1(x, y)[(u - u_H)^2 + (v - v_H)^2] + \gamma \sum_{(x,y) \in V} \omega_2(x, y)[(u - u_L)^2 + (v - v_L)^2]$$

in which V is the valid region in the image, (x, y) denotes a pixel in V, u and v are the abbreviations of u(x, y) and v(x, y) representing the components in x direction and y direction of $F_H^t$ at the point of (x, y) respectively. ($u_H$, $v_H$) represents the value of $V^H$ at (x, y), $\omega_1$(x, y) represents a weight. According to an embodiment of the present invention, $\omega_1$(x, y)=exp(−∥($u_H$, $v_H$)∥/10). ($u_L$, $v_L$) represents the value of $V^L$ at (x, y), $\omega_2$(x, y) is a weight, and according to an embodiment of the present invention, $\omega_2$(x, y)=1. $\beta$ and $\gamma$ are scale ratios. When the neighboring frames are valid, $\beta$ becomes larger which means that the neighboring information weight becomes larger with the temporal and spatial continuities dominated; if the neighboring frames are invalid, spatial accuracy should be reconsidered, and at this time, $\gamma$ is larger. In the present invention, if the neighboring reference frames are valid, $\beta$=2$\gamma$; otherwise $\beta$=0.

Step S305: Next, strategy 3 is used for completion, i.e. foreground reference inpainting. More specifically, the foreground region of the output image $I_{out}^t$ may be inpainted via bilinear interpolation after $SP_H^{ref_t}$ is transformed by the optical flow field $F_H^t$.

Step S306: Finally, strategy 4 is used for completion, i.e. low-spatial-resolution image inpainting for the image region still not inpainted. That is to say, the remaining region which is not inpainted is inpainted by the low-spatial-resolution image $I_L^t$ via bilinear interpolation.

Step S107: Post Processing. Post processing is applied to adjust the intensities after $I_{out}^t$ inpainting. This is necessary because even when all pixels in $I_{out}^t$ are perfectly inpainted, the intensity might still be inconsistent in the following two aspects of: 1) spatial inconsistence near the junction among neighboring regions with different inpainting types; 2) temporal inconsistence between successive frames. These phenomena might affect the visual effect sometimes.

The post processing may comprise the steps as follows.

1. The intensities are adjusted.

The intensities of $R_1$ and $R_4$ are adjusted to be consistent with $R_2$, and the adjusting method may be the one similar to that described in S202. $R_1$ represents the image region of the output image $I_{out}^t$ inpainted by the step S302. $R_2$ represents the image region of the output image $I_{out}^t$ inpainted by the step S303. $R_3$ represents the image region of the output image $I_{out}^t$ inpainted by the step S305. $R_4$ represents the image region of the output image $I_{out}^t$ inpainted by the step S306. When $R_1$ is adjusted, the pixels overlapping with the $I_{HB}^t$ may be used for calculating an intensity mapping model with only the overlapped pixels adjusted. When $R_4$ is adjusted, the pixels overlapping with the $I_{HB}^t$ may be used for calculating an intensity mapping model with all the pixels adjusted.

2. Spatial continuity is adjusted.

For the regions $R_1$, $R_2$ and $R_4$ of the output image $I_{out}^t$, they may be processed as follows: a structuring element such as 5×5 is used for dilating transition regions, i.e. boundaries, and the boundaries after dilation is smoothened with a 3×3 mean filter with the region $R_3$ unchanged.

In order to better understand the embodiments of the present invention, the above method of the present invention will be described in more detail hereinafter.

Step 1). A first active camera with a variable view angle or resolution is used as a static camera for monitoring a panoramic image, and a second active camera with a variable view angle or resolution is used for capturing an interested moving target.

Step 2). A panoramic image, which is also referred to as a low-spatial-resolution image $I_L^t$, is input into a PC from the first active camera, to convert each frame into a first gray image; an image recording the moving target, which is also referred to as a high-spatial-resolution image $I_H^t$, is input into the PC from the second active camera, to convert each frame into a second gray image; and the low-spatial-resolution and high-spatial-resolution images $I_L^t$, $I_H^t$ are replaced by the first and second gray images respectively.

Step 3). The registration of the low-spatial-resolution and high-spatial-resolution images are performed accordingly. A target region $I_{L\_tar}^t$ including the moving target in the low-spatial-resolution image $I_L^t$ is determined to obtain an output image $I_{out}^t$ in the high-spatial-resolution image $I_H^t$ corresponding to the target region $I_{L\_tar}^t$, then a mapping model $M_{LH}^t$ between the low-spatial-resolution image $I_L^t$ and the high-spatial-resolution image $I_H^t$ is calculated. In particular, this step may further comprise the following.

Step 3.1). A target region $I_{L\_tar}^t$ is determined or selected. In particular, step 3.1) may further comprise the following.

Step 3.1.1). A low-spatial-resolution background $I_{LB}^t$ is generated for the low-spatial-resolution image $I_L^t$. An updating formula at pixel (x, y) is $I_{LB}^t(x,y)=(1-\alpha)I_{LB}^{t-1}(x,y)+\alpha I_L^t(x,y)$, in which an updating coefficient $\alpha=0.05$; an initial low-spatial-resolution background model $I_{LB}^{t=0}(x,y)=I_L^{t=0}(x,y)$; and if $|I_L^t(x,y)-I_{LB}^t(x,y)|>T_{LB}$, $T_{LB}=20$, $I_L^t$ at pixel (x, y) belongs to a foreground region, otherwise, it belongs to a background region.

Step 3.1.2). By using a Mean-shift tracking algorithm provided by Opencv, and proving a low-spatial-resolution image $I_L^t$ at the $t^{th}$ frame and the foreground region obtained in step 3.1.1), the position of the interested target in the image $I_L^t$ may be obtained, and the mean value smoothing to the centers of the tracked target within a predetermined neighboring frames may be performed. The smoothed center of the tracked target is the center of the target, and is also the center of the rectangular region, and the rectangular region may have a length and a width with predetermined pixels respectively. According to an embodiment of the invention, the length and width thereof may be set to 64×48 pixels respectively. The size of the final high-spatial-resolution output image $I_{out}^t$ may be $k_o$ times as large as that of the target region $I_{L\_tar}^t$ in the low-spatial-resolution image. According to an embodiment of the invention, $k_o=5$.

Step 3.2). A rough registration model $M_{LH1}^t$ between the low-spatial-resolution image $I_L^t$ and the high-spatial-resolution image $I_H^t$ is generated by a feature-based registration method. According to an embodiment of the invention, in particular, the step 3.2) may comprise the following.

Step 3.2.1). SURF or SIFT feature points of the target region $I_{L\_tar}^t$ in the low-spatial-resolution image $I_L^t$ and the high-spatial-resolution image $I_H^t$ at the $t^{th}$ frame may be calculated respectively.

Step 3.2.2). A distance between each SURF or SIFT feature point in the high-spatial-resolution image $I_H^t$ and each SURF or SIFT feature point of the target region $I_{L\_tar}^t$ in the low-spatial-resolution image $I_L^t$ is calculated, $s_{12}=\|v_1-v_2\|$, in which $v_1$ and $v_2$ represent SIFT characteristic vectors corresponding to two SIFT feature points respectively. Then two groups of results $s_{min}^1$ and $s_{min}^2$ with the smallest distance are considered. If $s_{min}^1 < T_s \square s_{min}^2$, $T_s=0.7$, the SURF/SIFT feature point corresponding to $s_{min}^1$ in will be the matched SURF/SIFT feature point between the high-spatial-resolution image $I_H^t$ and the target region $I_{L\_tar}^t$ in the low-spatial-resolution image $I_L^t$, otherwise, the point may be considered to have no matching feature points. If the number of the total matched feature pixels between the two images is less than 10, the mapping model $M_{LH}^t$ between $I_L^t$ and $I_H^t$ will be invalid, and step (4) will follow, otherwise, step (3.3) will follow.

Step 3.2.3). An affine transformation matrix $$M_{LH1}^t = \begin{bmatrix} m_1 & m_2 & m_3 \\ m_4 & m_5 & m_6 \\ 0 & 0 & 1 \end{bmatrix}$$

based on the matched SIFT feature point pairs $\{(x_i^1, y_i^1) \in I_L^t, (x_i^2, y_i^2) \in I_H^t\}$, i=1, 2, ..., n between the high-spatial-resolution image $I_H^t$ and the target region $I_{L\_tar}^t$ the low-spatial-resolution image $I_L^t$ is generated, in which the parameters are generated by the following formula:

$$[m_1, m_2, m_3, m_4, m_5, m_6]^T = (A^T A)^{-1} AX, \text{ in which}$$

$$A = \begin{bmatrix} x_1^1 & y_1^1 & 1 & 0 & 0 & 0 \\ 0 & 0 & 0 & x_1^1 & y_1^1 & 1 \\ x_2^1 & y_2^1 & 1 & 0 & 0 & 0 \\ 0 & 0 & 0 & x_2^1 & y_2^1 & 1 \\ \vdots & \vdots & \vdots & \vdots & \vdots & \vdots \\ x_n^1 & x_n^1 & 1 & 0 & 0 & 0 \\ 0 & 0 & 0 & x_1^1 & x_1^1 & 1 \end{bmatrix}, \quad X = \begin{bmatrix} x_1^2 \\ y_1^2 \\ x_2^2 \\ y_2^2 \\ \vdots \\ x_n^2 \\ y_n^2 \end{bmatrix}$$

Step 3.3). An adjusted image $I_{L\_adj}^t$ is generated by adjusting an intensity of the low-spatial-resolution image $I_L^t$. In particular, this step may comprise the following.

Step 3.3.1). An intensity mapping region is selected. The matched SIFT feature point pairs in the two images $I_H^t$ and $I_{L\_tar}^t$ in step 3.2) are respectively represented by a convex polygon, with the vertex of the polygon represented by the feature points. All the feature point is positioned inside or on the vertex of the polygon, and the inside portion of the convex polygon is the intensity mapping region.

Step 3.3.2). Cumulative intensity histograms of the high-spatial-resolution image $I_H^t$ and the low-spatial-resolution image $I_L^t$ are obtained by accumulating the intensity histograms hist(k), k=0, 1, ..., 255 in the convex polygon according to the following formula:

$$Accu(K) = \frac{\sum_{k=1}^{K} hist(k)}{\sum_{k=1}^{32} hist(k)}, K = 0, 1, \ldots, 255.$$

Step 3.3.3). The cumulative intensity histograms of $I_L^t$ and $I_H^t$ are represented by $Accu^1$ and $Accu^2$ respectively, and three intensity sets $G_1$, $G_2$, $G_3$ are defined according to the following:

$G_1 = \{K : 0 \leq Accu^1(K) < 0.05\}$ $G_2 = \{K : 0.05 \leq Accu^1(K) < 0.95\}$ $G_3 = \{K : 0.95 \leq Accu^1(K) \leq 1\}$ The mapping model is selected as a three-piece-wise linear model $$K^2 = MI(K^1) = \begin{cases} a_1 K^1 + b_1, K^1 \in G_1 \\ a_2 K^1 + b_2, K^1 \in G_2 \\ a_3 K^1 + b_3, K^1 \in G_3, \end{cases}$$

in which $K^1$ and $K^2$ represent the intensities of $I_L^t$ and $I_H^t$ respectively. When using the following objective function to linearly fit $K \in G_2$, an intensity mapping model between the high-spatial-resolution image $I_H^t$ and the low-spatial-resolution image $I_L^t$ is $K^2 = MI(K^1) = a_2 K^1 + b_2$, $K^1 \in G_2$:

$$\min_{MI(\cdot)} \sum_{K \in G_2} |Accu^1(K) - Accu^2(MI(K))|$$

The intensity sets $G_1$ and $G_3$ are used to fit the models $K^2 = MI(K^1) = a_1 K^1 + b_1$, $K^1 \in G_1$ and $K^2 = MI(K^1) = a_3 K^1 + b_3$, $K^1 \in G_3$ respectively, so that, MI(0)=0, and MI(255)=255.

Step 3.3.4). The intensity of the low-spatial-resolution image $I_L^t$ is adjusted based on the intensity mapping model MI(k) to generate the adjusted image $I_{L\_adj}^t$.

Step 3.4). A refined registration model $M_{LH2}^t$ between the low-spatial-resolution image $I_L^t$ and the high-spatial-resolution image $I_H^t$ is generated using a direct pixel-based registration method. In particular, this step may comprise the following.

Step 3.4.1). The high-spatial-resolution image $I_H^t$ is transformed based on the rough registration model $M_{LH1}^t$ in step 3.2) to generate an image $I_{H\_adj}^t$. The transforming method may be as follows:

the value of the image $I_{H\_adj}^t$ at coordinate point $(x_i, y_i)$ is $I_{H\_adj}^t(x_i, y_i) = I_H^t(f(x_i, y_i, (M_{LH1}^t)^{-1}))$, in which f is a homogeneous coordinates conversion function, and may be calculated as follows:

f(x, y, M)=(x', y'), in which x' and y' is obtained by the following formula: $[x', y', 1]^T = M[x, y, 1]^T$.

Step 3.4.2). A gradient based Hessian matrix is utilized to iteratively solve the following optimal problem to generate a model $M_{refined}^t$ $$M_{refined}^t = \arg\min_M \sum_i \|I_{H\_adj}^t(x_i, y_i) - I_{L\_adj}^t(f(x_i, y_i, M))\|,$$

in which $(x_i, y_i)$ is the image of $I_H^t$ transformed by $M_{LH1}^t$, f refers to a homogeneous coordinates conversion function in step 3.4.1); and according to an embodiment of the invention, an initial value $M_0 = I_{3 \times 3}$.

Step 3.4.3). If $M_{refined}^t$ generated in step 3.4.2) satisfies either of the following two conditions, $M_{refined}^t$ and $M_{LH2}^t$ will be invalid, will not be calculated, and step 4) will follow:

a) $\|R_{2 \times 2}^M - I_{2 \times 2}\|_\infty < 0.3$;
b) $\|t_{2 \times 1}^M\|_\infty < 4$;
in which $M_{refined}^t = [R^M \ t^M]$, $[R_{2 \times 2}^M \ t_{2 \times 1}^M]$ is the first two rows of $M_{refined}^t$.

Step 3.4.4). The refined registration model $M_{LH}^t$ is generated based on the rough registration model $M_{LH1}^t$ and the registration model $M_{refined}^t$, where $M_{LH}^t = M_{LH1}^t M_{refined}^t$.

Step 3.5). The output image $I_{out}^t$ is smoothed based on the 2N+1 neighboring frames. According to an embodiment of the invention, N=5. In particular, this step may comprise the following.

Step 3.5.1). A transforming model $M_j^i$ from the $j^{th}$ high-spatial-resolution image to the $i^{th}$ high-spatial-resolution image is generated.

The foreground target in $I_H^t$ is obtained via the refined registration model $M_{LH2}^t$ by the corresponding foreground region in $I_L^t$ generated in step 3.1.1) using the transforming method in step 3.4.1), thus obtaining the background region of $I_H^t$. By the method in step 3.2), the transforming model $M_j^i$ from the $j^{th}$ high-spatial-resolution image to the $i^{th}$ high-spatial-resolution image is generated.

Step 3.5.2). The smoothing model $M_{LH}^t$ may be computed by the following formula:

$$M_{LH}^i = \frac{\sum_{i=t-N}^{t+N} \omega_i \delta_i M_i^t M_{LH2}^i}{\sum_{i=t-N}^{t+N} \omega_i \delta_i}$$

in which $\omega_i$ is Gaussian weight N=5, $$\omega_i = \frac{1}{\sqrt{2\pi}\sigma} e^{-\frac{(i-t)^2}{2\sigma^2}},$$

$\sigma = 1.5$, $\delta_i$ is the characteristic function satisfying:

$$\delta_j = \begin{cases} 1, & \text{if } M_j^i \text{ and } M_{LH2}^i \text{ are both valid} \\ 0, & \text{otherwise} \end{cases}$$

Step 3.5.3). The relative blurriness of the current frame $b_t$ is computed by the following formula:

$$b_t = \frac{1}{\sum_{p_t} [dx^2(p_t) + dy^2(p_t)]},$$

in which $p_t$ is the pixel point in the high-spatial-resolution image at the $t^{th}$ frame, dx(•) and dy(•) are gradients in x-direction and y-direction respectively.

If $b_t > 1.3 \min\{b_{t-1}, b_{t+1}\}$, the current frame will be a blurred image, and $M_{LH}{}^t$ will be invalid.

Step 4). The image is completed. The output image $I_{out}{}^t$ is inpainted based on the registration model $M_{LH}{}^t$ and the high-spatial-resolution image $I_H{}^t$ to complete the output image $I_{out}{}^t$. In particular, this step may comprise the following.

Step 4.1). The high-spatial-resolution background image $I_{HB}{}^t$ corresponding to $I_{LB}{}^t$ at the $t^{th}$ frame is estimated. In particular, this step may comprise the following.

Step 4.1.1). If the registration model $M_{LH}{}^t$ in step 4.1.1) is valid, the background region in the high-spatial-resolution image $I_H{}^t$ corresponding to the background region $I_{LB}{}^t$ in the low-spatial-resolution image $I_L{}^t$ of step 3.1.1) will be obtained by the transforming method in step 3.4.1) via the transforming model $M_{LH}{}^t$.

Step 4.1.2). For the $t^{th}$ frame, the high-spatial-resolution background regions in the $1^{st}, 2^{nd} \ldots (t+50)^{th}$ frames, are used to update the current high-spatial-resolution background model $I_{HB}{}^t$. For the background model $I_{HB}{}^{t+1}$ of the next frame, if $M_{LH}{}^t$ is valid, the background region of $I_H{}^{t+51}$ will be mapped onto $I_{HB}{}^t$, and the overlapping region will be updated with an attenuation factor 0.5, that is to say, the pixel intensity of the background region will be processed as follows: $I_{HB}{}^{t+1} = 0.5 I_{HB}{}^t + 0.5 I_H{}^{t+51}$; otherwise, $I_{HB}{}^{t+1} = I_{HB}{}^t$.

Step 4.2). $I_{out}{}^t$ is inpainted. In particular, this step may comprise the following.

Step 4.2.1). The output image $I_{out}{}^t$ is inpainted based on the registration model $M_{LH}{}^t$ and the high-spatial-resolution image $I_H{}^t$ to complete the output image $I_{out}{}^t$ which is not fully covered by the high-spatial-resolution image $I_H{}^t$. If the transforming model $M_{LH}{}^t$ is valid, the background region in the high-spatial-resolution image $I_H{}^t$ will be transformed onto the output image $I_{out}{}^t$ according to the transforming method in step 3.4.1) via the transforming model $M_{LH}{}^t$, and the overlapping region in the output image $I_{out}{}^t$ will be inpainted by the intensity of the high-spatial-resolution image $I_H{}^t$.

Step 4.2.2). For the background region, if the remaining region of the output image $I_{out}{}^t$ contains background pixels corresponding to valid pixels in the background image $I_{HB}{}^t$ will be used directly for inpainting the output image $I_{out}{}^t$.

Step 4.2.3). For the foreground region, if the $t^{th}$ frame meets one of the following three conditions, step 4.2.3.1) will follow. Otherwise, step 4.2.4) will be skipped to:
  a) the transforming model $M_{LH}{}^t$ being invalid;
  b) the high-spatial-resolution image $I_H{}^t$ not containing a complete interested object;
  c) the high-spatial-resolution image $I_H{}^t$ in step 3.5.3) being a blurred image.

Step 4.2.3.1). A reference sample sequence is established and updated.

According to an embodiment of the invention, the reference sample sequence has a maximum length of 60. If the $t^{th}$ frame meets one of the following three conditions, the frame will generate a reference sample:
  a) the transforming model $M_{LH}{}^t$ being valid;
  b) the high-spatial-resolution image $I_H{}^t$ containing a complete interested object;
  c) the high-spatial-resolution image $I_H{}^t$ in step 3.5.3) being not a blurred image.

An SP consists of a pair of image blocks $SP_L{}^i$ and $SP_H{}^i$ both of which contain a foreground region respectively, that is to say, $SP^i = \{SP_L{}^i, SP_H{}^i\}$, in which $SP_L{}^i$ represents a low-spatial-resolution fixed reference frame (40×40) containing only the foreground target in the $i^{th}$ frame, and $SP_H{}^i$ represents a high-spatial-resolution reference frame (200×200) corresponding to $SP_L{}^i$ containing only the foreground target in the $i^{th}$ frame. The reference sample sequence is updated by a First-In-First-Out (FIFO) strategy.

Step 4.2.3.2). A most matching reference frame $SP^{ref_t}$ with the current frame is estimated in the reference sample sequence.

For the $t^{th}$ frame, only rectangular image region $\text{sub}(I_L{}^t)$ containing the complete target in $I_L{}^t$ is considered, and similarities of all the $SP_L{}^i$, $i=1, 2, \ldots, 60$ in the reference frame sequence with the $\text{sub}(I_L{}^t)$ calculated as follows.

Step 4.2.3.2.1). A translation model $(dx, dy)^T$ from $SP_L{}^i$ to $\text{sub}(I_L{}^t)$ is calculated. The initial value is selected as the difference between the center point coordinates of the foreground target in $\text{sub}(I_L{}^t)$ and center point coordinates of the foreground target in the $SP_L{}^i$. Then, iteration based gradient descent optimizing algorithm is used for obtaining the translation model $(dx, dy)^T$.

Step 4.2.3.2.2). Similarity may be calculated based on the following formula:

$$\exp\left(-\frac{1}{Num(p)} \sum_{p \in Foreg(I_L^t), p-(dx, dy)^T \in Foreg(SP_L^i)} |(sub(I_L^t))(p) - SP_L^i(p-(dx, dy)^T)|\right)$$

in which $Foreg(SP_L{}^i)$ is the pixel sets of the foreground target in $SP_L{}^i$, $Foreg(I_L{}^t)$ is the pixel sets of the foreground target in $I_L{}^t$, p is a pixel in the intersection of the foreground pixel set of $SP_L{}^i$ after translation transformation and the Foreg $(I_L{}^t)$, $Num(p)$ is the pixel number in the intersection. If the pixel number in the intersection is less than 60% of the pixels in the $Foreg(SP_L{}^i)$ or less than 60% of the pixels in $Foreg(I_L{}^t)$, the similarity will be zero.

If the current $t^{th}$ frame is valid, the current frame will be a related reference frame which is denoted as $SP^{ref_t}$, i.e. $ref_t = t$, otherwise, the reference frame having a minimal similarity with the $\text{sub}(I_L{}^t)$ will be used as the related reference frame. If the maximal similarity is less than a similarity threshold $Th_{MAD} = \exp(-20)$, it will be considered that there is no related reference frame with $\text{sub}(I_L{}^t)$, i.e., the $SP^{ref_t}$ is invalid, otherwise, $SP^{ref_t}$ is valid.

Step 4.2.3.2.3). High-spatial-resolution image optical flow field $V^H$ between the current frame and the reference frame is estimated, which is estimated by three neighboring frames and the corresponding reference frames $SP_H{}^{ref_i}, i = t-1, t, t+1$.

Step 4.2.3.2.3.1). A translation model from $SP_H{}^{ref_{t-1}}$ to $SP_H{}^{ref_t}$ is obtained by the iteration based gradient descent optimizing algorithm. And $SP_H{}^{ref_{t-1}}$ is transformed to $SP_{t-1}{}^t$ by the translation model, thus removing the entire motion between $SP_H{}^{ref_{t-1}}$ and $SP_{t-1}{}^t$. Similarly, $SP_H{}^{ref_{t+1}}$ is transformed to $SP_{t+1}{}^t$ by the translation model, thus removing the entire motion between $SP_H^{ref_{i+1}}$ and $SP_{t+1}^t$. For the current frame, i.e., the $t^{th}$ frame, $SP_t^t = SP_H^{ref_i}$.

Step 4.2.3.2.3.2). The high-spatial-resolution optical flow field $V^H$ is estimated by the adjusted $SP_{t-1}^t$, $SP_t^t$, $SP_{t+1}^t$.

The pyramidal Lucas-Kanade optical flow method is used for estimating the optical flow fields $V_{t,t-1}^H$ and $V_{t,t+1}^H$ from $SP_t^t$ to $SP_{t-1}^t$ and $SP_{t+1}^t$ respectively. The optical flow field $V^H$ from $SP_t^t$ to the target frame $I_t^H$ may be approximated by $$\frac{1}{2}(V_{t,t-1}^H + V_{t,t+1}^H), \text{ i.e.:}$$

$$V^H = \frac{1}{2}(V_{t,t-1}^H + V_{t,t+1}^H)$$

Step 4.2.3.2.4). Inter-frame low-spatial-resolution image optical flow field $V^L$ is estimated. According to an embodiment of the present invention, the pyramidal Lucas-Kanade method is also used for estimating the optical flow field $F_L^t$ between $sub(I_L^{ref_i})_{adj}$ and $tar(I_L^t)$. According to an embodiment of the present invention, $V^L = 5F_L^t$.

Step 4.2.3.2.5). If $SP^{ref_i}$ is valid, the optical flow field $F_H^t$ between $SP_H^{ref_i}$ and $I_{out}^t$ will be estimated. $F_H^t$ may be solved by the following formula:

$$\min E = \beta \sum_{(x,y) \in V} \omega_1(x, y)[(u - u_H)^2 + (v - v_H)^2] + \gamma \sum_{(x,y) \in V} \omega_2(x, y)[(u - u_L)^2 + (v - v_L)^2],$$

in which V is the valid region in the image, (x, y) denotes a pixel in V, u and v are the abbreviations of u(x, y) and v(x, y) representing the components in x direction and y direction of $F_H^t$ at the point of (x, y) respectively. $(u_H, v_H)$ represents the value of $V^H$ at (x, y), $\omega_1(x, y)$ represents a weight. According to an embodiment of the present invention, $\omega_1(x, y) = \exp(-\|(u_H, v_H)\|/10)$. $(u_L, v_L)$ represents the value of $V^L$ at (x, y), $\omega_2(x, y)$ is a weight, and according to an embodiment of the present invention, $\omega_2(x, y) = 1$. $\beta$ and $\gamma$ are scale ratios. When the neighboring frames are valid, $\beta$ becomes larger which means that the neighboring information weight becomes larger with the temporal and spatial continuities dominated; if the neighboring frames are invalid, spatial accuracy should be reconsidered, and at this time, $\gamma$ is larger. In the present invention, if the neighboring reference frames are valid, $\beta = 2\gamma$; otherwise $\beta = 0$.

Step 4.2.3.2.6). Foreground reference is inpainted. More specifically, the foreground region of the output image $I_{out}^t$ may be inpainted via bilinear interpolation after $SP_H^{ref_i}$ is transformed by the optical flow field $F_H^t$.

Step 4.2.4). Low-spatial-resolution image is inpainted for the image region still not inpainted. That is to say, the remaining region which is not inpainted is inpainted by the low-spatial-resolution image $I_L^t$ via bilinear interpolation.

Step 4.3). The intensities are adjusted.

The intensities of $R_1$ and $R_4$ are adjusted to be consistent with $R_2$, and the adjusting method may be the one similar to that described in Step 3.3). $R_1$ represents the image region of the output image $I_{out}^t$ inpainted by the step 4.2.1). $R_2$ represents the image region of the output image $I_{out}^t$ inpainted by the step 4.2.2). $R_3$ represents the image region of the output image $I_{out}^t$ inpainted by the step 4.2.3). $R_4$ represents the image region of the output image $I_{out}^t$ inpainted by the step 4.2.4). When $R_1$ is adjusted, the pixels overlapping with the $I_{HB}^t$ may be used for calculating an intensity mapping model with only the overlapped pixels adjusted. When $R_4$ is adjusted, the pixels overlapping with the $I_{HB}^t$ may be used for calculating an intensity mapping model with all the pixels adjusted.

Step 4.4). Spatial continuity is adjusted.

Step 4.3). For the regions $R_1$, $R_2$ and $R_4$ of the output image $I_{out}^t$, they may be processed as follows: a structuring element such as 5×5 is used for dilating transition regions, i.e. boundaries, and the boundaries after dilation is smoothened with a 3×3 mean filter with the region $R_3$ unchanged.

According to the present invention, image registration problems between videos with different spatial resolutions may be solved smoothly. In addition, four following types of image completion strategies may be proposed: high-spatial-resolution image inpainting; high-spatial-resolution background image inpainting; foreground image inpainting and low-spatial-resolution image inpainting. Thus, current high-spatial-resolution information and historic high-spatial-resolution information may be fully used to inpaint target video. Through the above processing, the video may be used for collection of criminal evidences, storage of surveillance records, behavioral analysis of moving targets, etc. Experimental results have shown that the proposed stabilization and completion algorithms are very practical.

According to an embodiment of the invention, a video stabilizing system using a dual-camera system is further provided, comprising a first camera unit, a second camera unit and a controller, where the controller may be a PC or any other hardware device. The first camera unit is used for monitoring a panoramic image and sampling a low-spatial-resolution image $I_L^t$, where $I_L^t$ represents the low-spatial-resolution image at the $t^{th}$ frame. The second camera unit is used for capturing a moving target and sampling a high-spatial-resolution image $I_H^t$ where $I_H^t$ represents the high-spatial-resolution image at the $t^{th}$ frame, with the second camera unit synchronous with the first camera unit. The controller is used for receiving the low-spatial-resolution image $I_L^t$ and the high-spatial-resolution image $I_H^t$, outputting an output image $I_{out}^t$ of the high-spatial-resolution image $I_H^t$ corresponding to a target region $I_{L\_tar}^t$ where the moving target is located in the low-spatial-resolution image $I_L^t$, generating a registration model $M_{LH}^t$ between the low-spatial-resolution image $I_L^t$ and the high-spatial-resolution image $I_H^t$, and inpainting the output image $I_{out}^t$ based on the registration model $M_{LH}^t$ and the high-spatial-resolution image $I_H^t$ to complete the output image $I_{out}^t$ which is not fully covered by the high-spatial-resolution image $I_H^t$. In an embodiment of the invention, the first and second camera units may be independently an active camera. In another embodiment of the invention, the first and second camera units may be a static camera and an active camera respectively.

In an embodiment of the invention, the controller comprises a receiving module, an output image selecting module, a registration model generating module and an image inpainting module. The receiving module is used for receiving the low-spatial-resolution image $I_L^t$ and the high-spatial-resolution image $I_H^t$ captured by the first camera unit and the second camera unit respectively. The output image selecting module is used for outputting the output image in the high-spatial-resolution image $I_H^t$ corresponding to the target region $I_{L\_tar}^t$ where the moving target is located in the low-spatial-resolution image $I_L^t$. The registration model generating module is used for generating a registration model $M_{LH}^t$ between the low-spatial-resolution image $I_L^t$ and the high-spatial-resolution image $I_H^t$. The image inpainting module is used for inpainting the output image $I_{out}^t$ based on the registration model $M_{LH}^t$ and the high-spatial-resolution image $I_H^t$ to complete the output image $I_{out}^t$ which is not fully covered by the high-spatial-resolution image $I_H^t$.

In an embodiment of the invention, the registration model generating module comprises a rough registration module generating sub-module, an adjusted image generating sub-module, and a refined registration module generating sub-module. The rough registration module generating sub-module is used for generating a rough registration model $M_{LH1}^t$ between the low-spatial-resolution image $I_L^t$ and the high-spatial-resolution image $I_H^t$ using a feature-based alignment method. The correcting image generating sub-module is used for adjusting an intensity of the low-spatial-resolution image $I_L^t$ to obtain the adjusted image $I_{L\_adj}^t$. The refined registration module generating sub-module is used for generating a refined registration module $M_{LH2}^t$ between the low-spatial-resolution image $I_L^t$ and high-spatial-resolution image $I_H^t$ using a pixel-based direct-alignment method based on the rough registration model $M_{LH1}^t$ and the adjusted image $I_{L\_adj}^t$.

In an embodiment of the invention, the output image is inpainted by the image inpainting module based on the strategies 1 to 4 as described above to obtain inpainted regions $R_1$ to $R_4$ respectively.

In an embodiment of the invention, the controller further comprises a post-processing module for post processing the output image after inpainting to adjust intensity and spatial continuity of the output image.

By using the video stabilizing system using a dual-camera system according to the present invention, image registration problems between videos with different spatial resolutions may be solved smoothly. In addition, four following types of image completion strategies may be proposed: high-spatial-resolution image inpainting; high-spatial-resolution background image inpainting; foreground image inpainting and low-spatial-resolution image inpainting. Thus, current high-spatial-resolution information and historic high-spatial-resolution information may be fully used to inpaint target video. Through the above processing, the video may be used for collection of criminal evidences, storage of surveillance records, behavioral analysis of moving targets, etc. Experimental results have shown that the proposed stabilization and completion algorithms are very practical.

Reference throughout this specification to "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A video stabilizing method, comprising the steps of:
1) capturing a low-spatial-resolution image $I_L^t$ by a first camera for monitoring a panoramic area and a high-spatial-resolution image $I_H^t$ by a second camera which is synchronous with the first camera for capturing an image of a moving target where $I_L^t$, $I_H^t$ represent the low-spatial-resolution image and the high-spatial-resolution image at the $t^{th}$ time respectively;
2) determining a target region $I_{L\_tar}^t$ including the moving target in the low-spatial-resolution image $I_L^t$, and obtaining an output image $I_{out}^t$ of the high-spatial-resolution image $I_H^t$ corresponding to the target region $I_{L\_tar}^t$;
3) generating a registration model $M_{LH}^t$ between the low-spatial-resolution image $I_L^t$ and the high-spatial-resolution image $I_H^t$; and
4) inpainting the output image $I_{out}^t$ based on the registration model $M_{LH}^t$ and the high-spatial-resolution image $I_H^t$ to complete the output image $I_{out}^t$.

wherein the step 3) further comprises:
generating a rough registration model $M_{LH1}^t$ between the low-spatial-resolution image $I_L^t$ and the high-spatial-resolution image $I_H^t$ by employing a feature-based alignment algorithm;
generating an adjusted image $I_{t\_adj}^t$ by adjusting an intensity of the low-spatial-resolution image $I_L^t$;
generating a refined registration model $M_{LH}^t$ between the low-spatial-resolution image $I_L^t$ and the high-spatial-resolution image $I_H^t$ based on the rough registration model $M_{LH1}^t$ and the adjusted image $I_{L\_adj}^t$ by a pixel-based alignment algorithm, and the step of generating a rough registration model $M_{LH1}^t$ further comprises:
calculating SURF or SIFT key points of the target regions $I_{L\_tar}^t$ in the low-spatial-resolution image $I_L^t$ and the high-spatial-resolution image $I_H^t$ respectively;
calculating a distance between each SURF or SIFT key point of the high-spatial-resolution image $I_H^t$ and each SURF or SIFT key point of the target region $I_{L\_tar}^t$ in the low-spatial-resolution image $I_L^t$, to generate matched SURF or SIFT key points between the high-spatial-resolution image $I_H^t$ and the target region $I_{L\_tar}^t$ in the low-spatial-resolution image $I_L^t$; and
generating the rough registration model $M_{LH1}^t$ based on the matched SURF or SIFT key points.

2. The method according to claim 1, wherein the first camera is a static camera or an active camera, and the second camera is an active camera.

3. The method according to claim 1, wherein the step of generating an adjusted image $I_{L\_adj}^t$ further comprises:
selecting an intensity mapping region, and obtaining cumulative intensity histograms of the high-spatial-resolution image $I_H^t$ and the low-spatial-resolution image $I_L^t$;
generating an intensity mapping model MI(k) between the high-spatial-resolution image $I_H^t$ and the low-spatial-resolution image $I_L^t$; and
adjusting the intensity of the low-spatial-resolution image $I_L^t$ based on the intensity mapping model MI(k) to generate the adjusted image $I_{L\_adj}^t$.

4. The method according to claim 1, wherein the step of generating a refined registration model $M_{LH}^t$ further comprises:
converting the high-spatial-resolution image $I_H^t$ based on the rough registration model $M_{LH1}^t$ to generate an image $I_{H\_adj}^t$;
generating a model $M_{refined}^t$ based on the image $I_{H\_adj}^t$ and the adjusted image $I_{L\_adj}^t$;
generating the refined registration model $M_{LH}^t$ based on the rough registration model $M_{LH1}^t$ and the model $M_{refined}^t$, where $M_{LH}^t = M_{LH1}^t M_{refined}^t$.

5. The method according to claim 1 or 2, wherein the step 4) further comprises:
    inpainting the output image $I_{out}^{t}$ based on strategies 1 to 4 to obtain inpainted regions $R_1$ to $R_4$ respectively, where:
    the strategy 1 includes: inpainting the output image $I_{out}^{t}$ according to the registration model $M_{LH}^{1}$ and the high-spatial-resolution image $I_{H}^{t}$ in the case of the registration model $M_{LH}^{t}$ being valid;
    the strategy 2 includes: inpainting the output image $I_{out}^{t}$ using a background image $I_{HB}^{t}$ of the high-spatial-resolution image $I_{H}^{t}$ in the case of the remaining region of the output image $I_{out}^{t}$ containing background pixels;
    the strategy 3 includes: inpainting the output image $I_{out}^{t}$ according to a method based on reference sample patch and relative motion field in the case of the registration model $M_{LH}^{t}$ being invalid, the high-spatial-resolution image $I_{H}^{t}$ not containing the entire moving target or the high-spatial-resolution image $I_{H}^{t}$ being a blurred image;
    the strategy 4 includes: inpainting the remaining region of the output image $I_{out}^{t}$ which is not inpainted by the strategies 1 to 3 using the low-spatial-resolution image $I_{L}^{t}$.

6. The method according to claim 5, wherein the step of inpainting the output image $I_{out}^{t}$ according to a method based on reference sample patch and relative motion field further comprises the steps of:
    establishing and updating a reference frame sequence;
    selecting a reference frame $SP^{ref_t}$ from the reference frame sequence;
    generating an inter-frame high-spatial-resolution optical-flow field $V^H$ and an inner-frame low-spatial-resolution optical-flow field $V^L$ based on the reference frame sequence;
    generating an optical-flow field $F_{H}^{t}$ between the reference frame $SP^{ref_t}$ and the output image $I_{out}^{t}$ based on the inter-frame high-spatial-resolution optical-flow field $V^H$ and the inner-frame low-spatial-resolution optical-flow field $V^L$; and
    performing foreground inpainting of the output image $I_{out}^{t}$ based on the optical-flow field $F_{H}^{t}$ and the reference frame sequence.

7. The method according to claim 5, the step 4) further comprising:
    post processing the inpainted image to adjust the intensity and spatial continuity of the output image $I_{out}^{t}$ after inpainting the output image $I_{out}^{t}$ based on the registration model $M_{LH}^{t}$ and the high-spatial-resolution image $I_{H}^{t}$.

8. The method according to claim 7, wherein the step of adjusting the intensity of the output image $I_{out}^{t}$ further comprises:
    for the region $R_1$ of the output image $I_{out}^{t}$, calculating the intensity mapping model using pixels of a region overlapped with the background image $I_{HB}^{t}$ only, and adjusting the pixels of the region overlapped with the background image $I_{HB}^{t}$ only; and
    for the region $R_4$ of the output image $I_{out}^{t}$, calculating the intensity mapping model using pixels of a region overlapped with the background image $I_{HB}^{t}$, only, and adjusting all the pixels of the output image $I_{out}^{t}$.

9. The method according to claim 7, wherein the step of adjusting the spatial continuity of the output image $I_{out}^{t}$ further comprises:
    for the regions $R_1$, $R_2$ and $R_4$ of the output image $I_{out}^{t}$, expanding the boundaries of the regions $R_1$, $R_2$ and $R_4$ by a 5×5 structuring element respectively;
    smoothing the expanded boundaries of the regions $R_1$, $R_2$ and $R_4$ by a 3×3 mean filter respectively; and
    keeping the region $R_3$ of the output image $I_{out}^{t}$ unchanged.

* * * * *